United States Patent [19]

Walker

[11] Patent Number: 4,655,991
[45] Date of Patent: Apr. 7, 1987

[54] DETECTOR FOR FUEL ASSEMBLY

[75] Inventor: Edward S. Walker, Westchester, Ohio

[73] Assignee: General Electric Company, San Jose, Calif.

[21] Appl. No.: 662,148

[22] Filed: Oct. 18, 1984

[51] Int. Cl.⁴ .............................................. G21C 17/00
[52] U.S. Cl. .................................... 376/245; 376/260; 116/205
[58] Field of Search ........................ 376/245, 260, 247; 116/205, 311, 312, 313, DIG. 17; 294/88, 90, 97, 101

[56] References Cited

U.S. PATENT DOCUMENTS 2,789,859  4/1957  Woellner ................................ 294/90
3,511,091  5/1970  Thome .................................. 376/249

Primary Examiner—Salvatore Cangialosi
Attorney, Agent, or Firm—Ivor J. James, Jr.; Raymond G. Simkins

[57] ABSTRACT

A probe is disclosed for detecting the absence of helical springs from an array of mutually spaced springs, each mounted on a separate shank. The probe includes an elongate arm having a pair of pawls mounted in an aperture at one end of the arm, biased to extend from the aperture. During probing, the helical springs normally prevent the pawls from assuming their extended positions outside the aperture, which is urged by the applied biasing force. If a helical spring is missing from the array, the appropriate pawl pivots outward into its extended position and becomes lodged against the springless shank to lock the probe in position. Its location in the array then indicates where a spring must be replaced.

7 Claims, 2 Drawing Figures

DETECTOR FOR FUEL ASSEMBLY

The present invention relates in general to nuclear fuel assemblies, and more particularly to apparatus for detecting the absence of helical springs on the shanks of fuel rod end plugs.

BACKGROUND OF THE INVENTION

In certain types of nuclear reactors, the nuclear fuel is contained in fuel rods. The fuel rods are grouped in fuel bundles, within which the fuel rods are equidistantly positioned from each other in a spaced array. The array itself is supported between an upper and a lower tie plate. A number of these fuel bundles are combined to form the nuclear fuel assembly.

An arrangement of the type described is shown in U.S. Pat. No. 4,022,661, which is assigned to the assignee of the present invention. As shown, each fuel rod is resiliently supported between the tie plates by virtue of helical springs surrounding the elongated, reduced-diameter shanks of the upper end plugs of the fuel rods. This arrangement allows longitudinal expansion of the individual fuel rods. It also insures that the fuel rods are firmly seated in the lower tie plate to dampen vibration as pressurized liquid coolant flows upward through the fuel bundle to remove heat from the fuel rods. Typically, the lowest coil of each helical spring is of reduced diameter to provide a friction fit on the end plug shank. This inhibits "pop off" of the springs when the upper tie plate is removed. Further, it inhibits the spring from falling off during manipulation of a fuel rod outside the array. Not withstanding these precautions, springs are occasionally lost from the shanks of the end plugs. Poor visibility and other factors may prevent such a condition from being discovered before the upper tie plate is replaced or first installed.

Once the fuel bundle is assembled, the upper tie plate obstructs the view of an observer, particularly with respect to those springs which are mounted on end plugs located near the center of the assembly. Thus, any visual inspection for the presence of these springs is precluded without removing the upper tie plate. Since the act of removing the tie plate may itself cause springs to be lost, as well as being a cumbersome and time-consuming procedure, there currently exists no satisfactory way for reliably detecting the absence of helical springs on the shanks of fuel rod end plugs in the assembled fuel bundle.

OBJECTS OF THE INVENTION

It is a principal object of the present invention to provide new and improved apparatus for detecting the absence of springs on the shanks of fuel rod end plugs, which is not subject to the foregoing disadvantages.

Another object of the present invention is to provide a new and improved probe which permits ready and quick inspection of the springs on fuel rods located in an area of a fuel assembly that is inaccessible and blocked to visual inspection.

An additional object of the present invention is to provide a new and improved probe which permits the positive detection of springs that are missing from the shanks of the fuel rod end plugs of a fuel assembly, without the necessity of removing parts from the latter.

A further object of the present invention is to provide a new and improved probe which positively indicates the location within the fuel bundle of the fuel rod that is missing a spring.

Still another object of the present invention is to provide a new and improved probe which locks in place when the absence of a spring is detected and which requires corrective action to be taken before the probe can be withdrawn from the fuel assembly.

Yet another object of the present invention is to provide a new and improved probe for detecting the absence of springs on the shanks of fuel rod end plugs which is simple in construction and inexpensive to manufacture.

SUMMARY OF THE INVENTION

In accordance with the present invention, a probe is provided which comprises an elongate arm having at least one spring-engaging pawl resiliently biased outward from the shaft. When the probe is inserted between two rows of end plugs of the array, or withdrawn, contact with the springs that are present on the end plugs prevents the pawl from assuming its fully extended position urged by the applied resilient bias. If, however, a spring is missing from the shank of an end plug in the array, the pawl is allowed to move outward relative to the arm so as to become lodged between the springless end plug and its immediate neighbor. This action prevents the subsequent withdrawal of the probe from the fuel assembly and requires that the upper tie plate of the fuel assembly be removed. The position of the probe then indicates to the operator where a new spring must be placed on an end plug.

The foregoing and other objects of the present invention, together with the features and advantages thereof, will become apparent from the following detailed specification when read with the accompanying drawings in which applicable reference numerals have been carried forward.

DETAILED DESCRIPTION OF THE INVENTION

Figure 1:
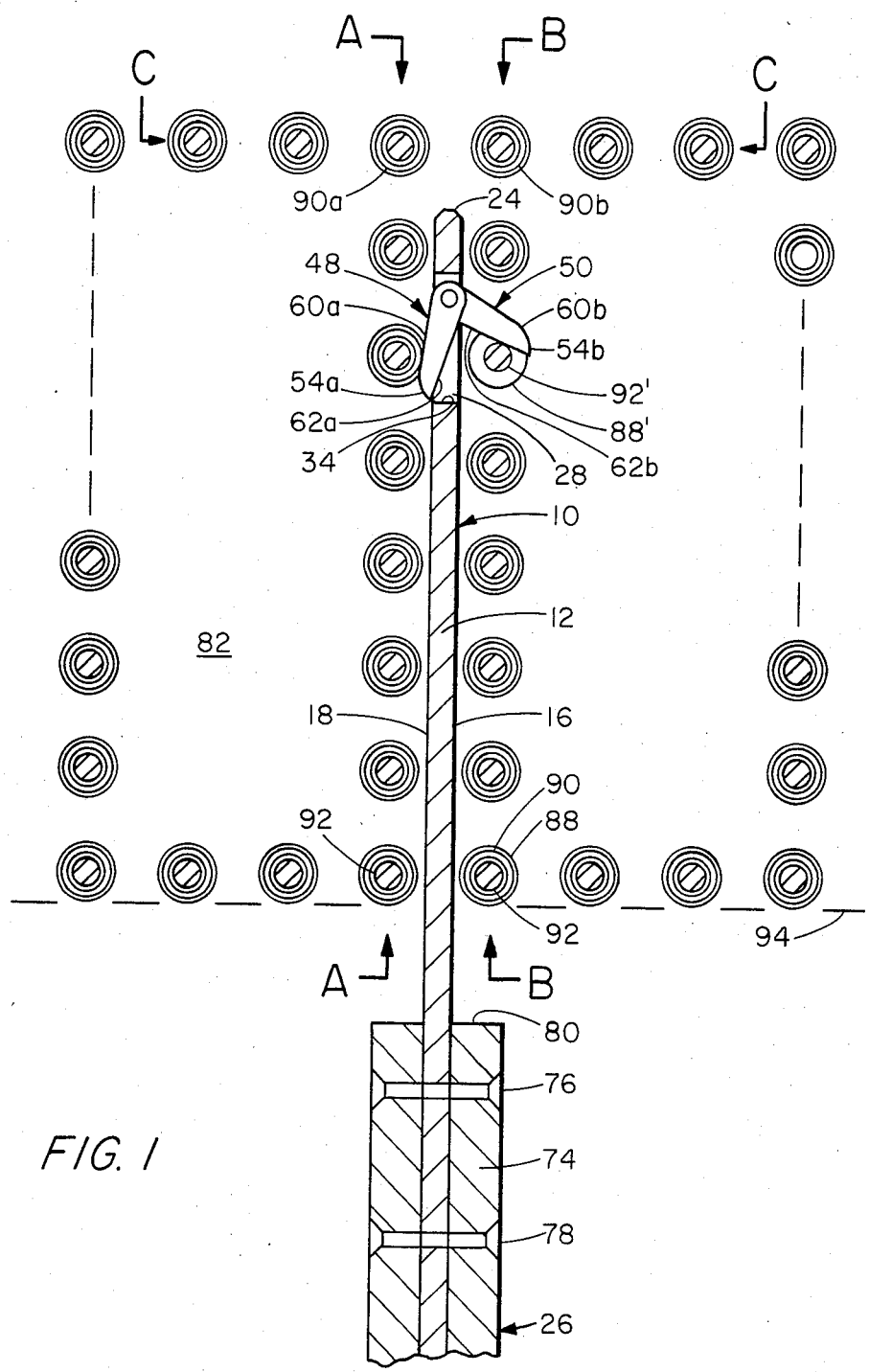
FIG. 1 is a cross sectional view of the present invention which illustrates the probe in an array of spring-bearing shanks.

With reference now to the drawings, FIG. 1 illustrates a linear matrix array 82 of helical springs 90, such as may be used in a nuclear fuel assembly. The fuel assembly typically includes a matrix array of fuel rods wherein each fuel rod comprises an elongate tube containing a fissionable fuel material. Each tube is sealed at opposite ends by means of end plugs, e.g. as shown in U.S. Pat. No. 4,022,661, which engage corresponding tie plates. Helical springs 90 are fitted around shanks 92 of upper end plugs 88 to allow expansion of the fuel rods and to insure firm seating of the latter. In row B—B of matrix array 82, shank 92' of end plug 88' is shown with its helical spring missing. The location of shank 92' within array 82 is such as to be inaccessible to visual inspection without removing the upper tie plate.

Probe 10, which constitutes the subject matter of the present invention, includes an elongate arm 12 formed of a rigid material such that the arm will not warp and lose its linearity with repeated use. Arm 12 has a substantially rectangular cross section, having a width defined by first and second parallel sides 16 and 18 enabling it to be inserted between adjacent rows of helical springs 90 and a height less than the height of the springs. The length of arm 12 is sufficient to probe the full length of a row of helical springs, e.g. the length of rows A—A and B—B in linear matrix array 82. Arm 12 includes a forward end 24 and a holding end 26. A rectangular aperture 28 is formed near the forward end of the arm. The height of aperture 28 is defined by surfaces 30 and 32, and its length by surfaces 34 and 36. A pivot pin 42 is transversely positioned in aperture 28, parallel to sides 16 and 18, and with opposite pin ends embedded in surfaces 30 and 32.

First and second substantially identical pawls 48 and 50 are mounted in superposed relationship on pivot pin 42 within aperture 28. Each pawl is capable of rotational movement about pivot pin 42, between a retracted and an extended pawl position and each is constrained from rotating beyond substantially a ninety degree arc with respect to arm 12. Each pawl includes first and second pawl ends 52 and 54 respectively, a forward pawl surface 60 which has a rounded surface portion near pawl end 54, and a flat rear pawl surface 62. The angle of surfaces 60 and 62 relative to each other is such as to define a surface discontinuity at pawl end 54. In FIG. 1, the respective pawl portions are designated with letter subscripts to permit separate reference to each. The dimensions of the aperture and the pawls are such that the pawls are completely contained in the aperture in their retracted positions e.g. as shown by pawl 48 in FIG. 1. Both pawls are notched near their respective first ends 52 to receive a torsion spring 68 which is coaxially disposed on pivot pin 42. Spring 68 applies a bias to each pawl, urging end 54a of pawl 48 out of aperture 28 beyond side 18 of arm 12 and urging end 54b of pawl 50 out beyond side 16.

A handle 74 is affixed to arm 12 near holding end 26 by means of suitable fasteners 76 and 78 such as screws or rivets and provides a hand grip for the manual operation of probe 10. Handle surface 80 provides a stop against outer structure 94 of the fuel bundle in which the fuel rods are located. This prevents the insertion of probe 10 into linear matrix array 82 to a point beyond the last row of elements C—C in array 82.

In operation, in order to detect the absence of any helical springs missing in rows A—A and B—B of the array, probe 10 is inserted horizontally into the space between these rows by way of its forward end 24. As the probe is advanced into linear matrix array 82, contact between pawl surfaces 60b and 60a and the helical springs in rows B—B and A—A, urges pawls 48 and 50 toward arm 12 and thus toward their retracted positions within aperture 28, against the force of the torsion spring. Probe 10 is advanced into array 82 until handle surface 80 abuts outer structure 94. The length of arm 12 is chosen so that the absence of a helical spring in row C—C will allow the appropriate pawl to pivot to its extended position, but not so long as to allow the pawls to assume their extended position when helical springs 90a and 90b are present.

The withdrawal of probe 10 proceeds smoothly by virtue of the rounded surface portions of surfaces 60a and 60b near pawl ends 54a and 54b respectively, which make sliding contact with springs 90 in both directions of probe movement. Thus, as probe 10 is withdrawn from the space between rows A—A and B—B, helical springs 90 on the shanks of end plugs 88 continue to urge pawls 48 and 50 toward their respective retracted positions. Hence, as long as all springs 90 are present, the pawls are prevented from assuming their respective extended positions. Testing of the array for absent springs 90 continues by insertion of the probe between subsequent row pairs, until the matrix has been completely checked out.

Figure 2:
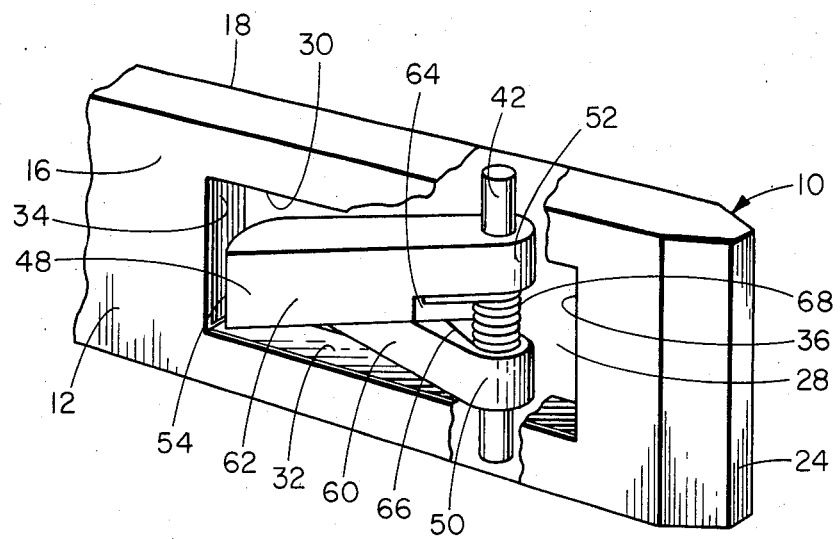
FIG. 2 illustrates a portion of the probe of FIG. 1 in greater detail.

If a helical spring 90 is missing, as indicated in FIG. 2 with respect to shank 92′ in row B—B, pawl 50 will pivot to its extended position at the location in question, as urged by torsion spring 68. Upon attempted withdrawal of the probe, the extended pawl becomes lodged against springless shank 92′. Since the pawl is constrained from pivoting more than 90° and the construction of the fuel bundle prevents lifting the probe out, the probe is effectively locked against withdrawal from the array. To retrieve the probe, the upper tie plate of the fuel bundle must be removed. The position of the locked-in probe then indicates to the operator the location of the missing spring, which is replaced before reassembly.

The present invention is not limited to use in a linear matrix array. With a suitably curved arm, the probe may also be used where the elements tested for are arranged in curved rows. Also, the probe may carry only a single pawl for use in ascertaining the absence of an element in a single row of elements. It will also be clear that the use of the probe with linear matrix array 82 is not limited to testing rows of elements parallel to rows A—A and B—B, but that it may also be used along rows parallel to row C—C.

In a broader sense, the present invention is not limited to testing for the absence of helical springs, but it is applicable to detect the absence of an element from any suitable array of dimensionally similar elements which are regularly spaced from each other. Further, the invention is not limited to the particular embodiment illustrated and described. Numerous variations, changes, modifications, substitutions and equivalents will now occur to those skilled in the art, all falling within the true spirit and scope of the invention. Accordingly, the invention is intended to be limited only by the scope of the appended claims.

What is claimed is:

1. An apparatus for detecting the absence of a spring element from among a fuel bundle for a nuclear reactor comprising a plurality of dimensionally similar grouped fuel rod elements mutually spaced in a predetermined array;

said apparatus comprising:

a probe adapted to be guided along rows of said array;

said probe including at least one pawl capable of moving between a retracted and an extended position;

means for biasing said pawl toward said extended position, said biasing means adapted to urge said pawl into contact with said grouped fuel rod elements during probing along said rows; and said probe being dimensional with respect to said spaced fuel rod elements to allow said pawl to assume said extended position only at a location where a spring element is missing;

whereby said probe is locked at said location against withdrawal from said array to indicate the absence of said missing spring element.

2. Apparatus in accordance with claim 1 wherein said probe comprises an elongate arm including oppositely positioned forward and holding ends respectively;

said pawl being supported substantially at said forward end of said arm; and said biasing means urging said pawl outward relative to said arm.

3. Apparatus in accordance with claim 2 wherein said pawl is adapted to pivot with respect to said arm between said retracted and extended positions.

4. Apparatus in accordance with claim 3 and further including:

an aperture communicating between opposite sides of said arm;

a pivot pin transversely positioned in said aperture;

said pawl including first and second opposite ends and being pivotably mounted on said pin at said first pawl end;

said aperture being dimensioned to completely contain said pawl in said retracted position; and said biasing means including a torsion spring surrounding said pin and urging said second pawl end beyond one side of said arm and toward said forward end of said arm.

5. Apparatus in accordance with claim 4 wherein said elements comprise substantially identical helical springs each mounted on a separate vertical shank, said springs being disposed in a linear matrix array accessible to said probe only in a horizontal direction such that said springs are probed sequentially in a forward direction in each row;

said pawl being constrained from pivoting beyond substantially 90° in said forward direction; and said pawl including a rounded forward surface portion at said second pawl end adapted to provide sliding contact with said springs during said probing in said forward direction, and a substantially flat rear pawl surface adjacent said rounded surface portion and angled relative to the latter to define a surface discontinuity therebetween at said second pawl end.

6. Apparatus in accordance with claim 4 or 5 wherein said pin carries a pair of substantially identical pawls pivotably mounted thereon at respective first pawl ends;

said torsion spring urging respective second pawl ends beyond opposite sides of said arm;

whereby a pair of adjacent rows can be probed simultaneously.

7. A probe for detecting the absence of a helical spring from a linear matrix array of mutually spaced, substantially identical helical springs each mounted on a separate vertical shank, said springs being obstructed by surrounding structure so as to be accessible to said probe only in sequence in a forward direction in each row of said matrix;

said probe comprising:

an elongate arm including oppositely positioned forward and holding ends, an aperture at said forward end communicating between opposite sides of said arm;

a pivot pin transversely positioned in said aperture;

a pair of substantially identical pawls mounted in superposed relationship on said pin;

a pair of substantially identical pawls mounted in superposed relationship on said pin;

each of said pawls being pivotably disposed on said pin at a first pawl end and being constrained to pivot between a retracted position wherein said pawl is completely contained in said aperture and an extended position substantially 90° with respect to said arm;

each of said pawls including a rounded forward surface portion at a second pawl end opposite said first pawl end adapted to provide sliding contact with said springs during probing in said forward direction, each pawl further including a substantially flat rear pawl surface adjacent said rounded surface portion and angled relative to the latter to define a surface discontinuity therebetween at said second pawl end;

a torsion spring surrounding said pin and urging each of said second pawl ends toward said extended position and into contact with said helical springs during probing along said rows;

said probe being dimensioned with respect to said mutually spaced helical springs to allow said pawls to assume said extended position only at a location where a helical spring is missing;

whereby said probe is locked at said location against withdrawal from said array to indicate the absence of said missing helical spring.

* * * * *